United States Patent Office 2,935,260
Patented May 3, 1960

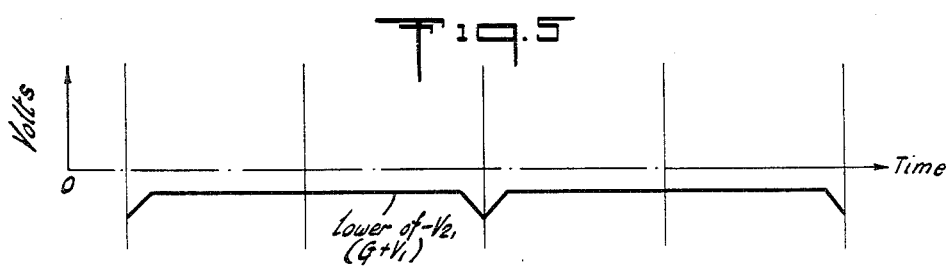
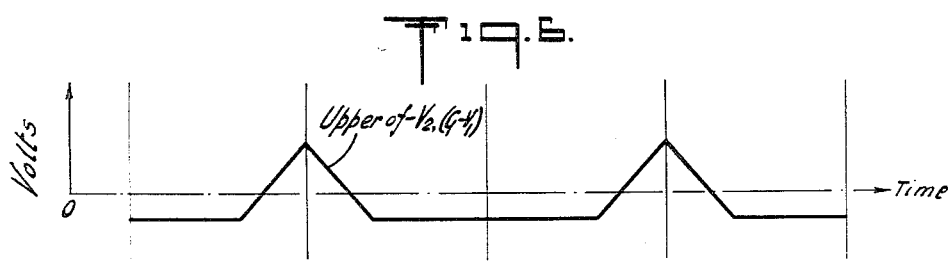
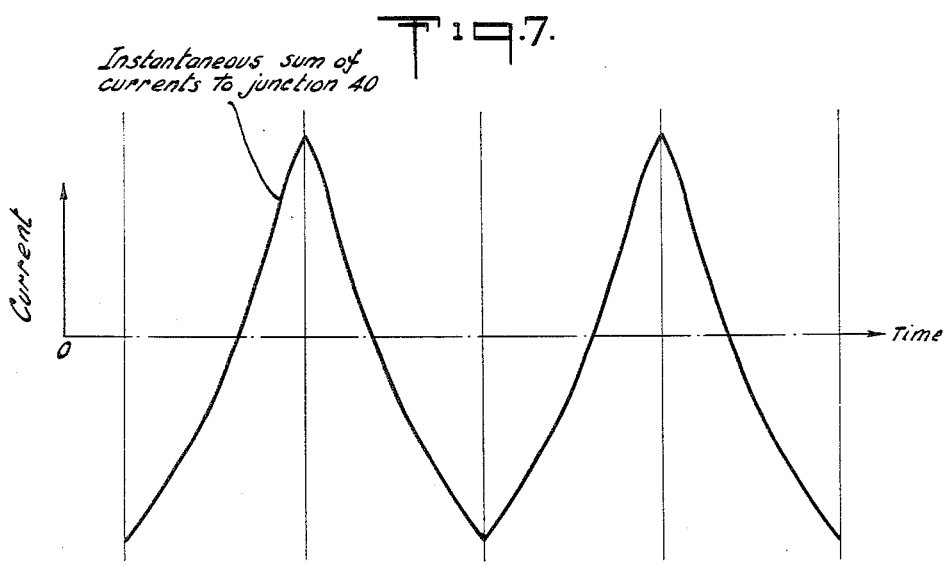

2,935,260
ANALOG MULTIPLIER

George A. Philbrick, Dover, and Roger R. Noble, Norwell, Mass., assignors to George A. Philbrick Researches, Inc., Boston, Mass.

Application January 23, 1957, Serial No. 635,655

7 Claims. (Cl. 235—194)

This invention relates to the computation of quantities and more particularly it relates to an improved and simplified method and apparatus for multiplication. The invention is related to that claimed in the inventor Philbrick's co-pending application Serial No. 486,050, filed February 4, 1955.

An object of this invention is to provide an improved and simplified method of computation, such as multiplication, which can be performed quickly and with great accuracy for use, for example, in analog computers.

A further object is to provide a simple and inexpensive apparatus adapted to utilize this method. These and other objects will in part be understood from and in part pointed out in the description given hereinafter.

Two general systems of computation particularly suitable for machine computers are widely used at the present time. The first of these is the digital system wherein quantities are represented by discrete numbers and operated on arithmetically to obtain answers. In this system, any desired degree of accuracy can be obtained simply by carrying out the required operations with the necessary number of digits. A disadvantage of this system, however, is the necessity of programming, that is, of representing each quantity to be operated on by a series or sequence of digits and of planning the step by step operations to be performed on these digits. This is discussed more fully in "Computing Bit by Bit," p. 1223, Proc. IRE October 1953. Moreover, because of the relative difficulty of performing certain calculations, such as numerical multiplication, as compared to addition or subtraction, a machine when adapted for these calculations tends to be complex, bulky, and very expensive.

The second widely used system of computation, the analog, operates directly on quantities without first converting them into numbers and is therefore able to by-pass entirely the programming step required in digital systems. An illustration of such a device is a slide rule which multiplies quantities by adding together physical lengths related to the quantities. With the development of highspeed measuring equipment, the need for high-speed computers has become increasingly urgent and because analog computers can be made to operate at high speed they are well suited for applications where speed is important. However, to utilize most fully this advantage of an analog computer, a continuous multiplying device is required, wherein two or more quantities to be multiplied can be supplied to the device in the form of measurable physical variables, and the resulting quantity, which should be proportional to the mathematic product of the supplied quantities, can be derived from the device in the form of a physical variable. The physical variables involved may be of the same or of different kinds.

It is generally recognized that, whereas the operations of adding, subtracting, multiplying by a constant, and integrating and differentiating with respect to time are now satisfactorily performed with rather simple equipment, this has not been true in the case of the multiplying together of two variables.

To be of most general usefulness, a multiplying device of this kind should be both accurate and fast, should have very high resolution, and should be without discontinuities. Further, it should accept and deliver negative quantities as easily and as accurately as positive quantities; that is to say, it should possess "four quadrant" operation. And of course it should be stable with time, not changing its proportionality of response or operating level in a disturbing degree. Finally, it should be compact, easy to adjust and economical in manufacturing costs and power consumption.

In theory, one of the simplest of the various kinds of high-speed analog multipliers is an "area type" multiplier in which the amplitude of a voltage or current square wave comprising a train of pulses at fixed repetition-rate is made proportional to one quantity to be multiplied and the duration, i.e. length, of the wave is made proportional to a second quantity to be multiplied. The magnitude of the area enclosed by this voltage or current wave is then proportional to the product of the two quantities, as is the average voltage or current signal derived from it. The features of this arrangement are its simplicity and the fact that answers can be obtained relatively rapidly. However, the overall accuracy is low because of the difficulty of generating a sufficiently "square" square wave and of keeping it square, especially when operated at a high speed. In addition, it suffers from the serious disadvantage of not being able to multiply negative quantities except with very complicated additional apparatus. Various attempts to improve its accuracy have been made in the past but so far as is known these have failed to provide a good multiplier which is also fast, simple and inexpensive. For this reason, other more complex kinds of analog multipliers have been devised and are used instead.

One popular kind of "non-area type" of multiplier is that which utilizes the "quarter square difference" principle, i.e. that illustrated by the expression:

$$\frac{(a+b)^2 - (a-b)^2}{4} = ab$$

Such a multiplier is disclosed in U.S. Patent No. 2,674,409 to Lakatos.

The accuracy of this system depends upon, among other things, the fidelity and similarity of the squaring circuits used, and upon the stability of the adding and subtracting circuits. More importantly, large fractional errors are involved in taking the difference between nearly equal quantities and, accordingly, the accuracy of the system falls off when one of the input quantities approaches zero. A wide gap remains, therefore, between multipliers which are fast, simple and easy to use and those which are accurate but expensive and, in the case or digital multipliers, relatively difficult to use. The present invention is intended to fill this gap.

In accordance with the present invention, a method for multiplying two or more quantities is provided which retains the basic features of area-type multiplication but which by-passes the difficulties inherent therein. In particular, the square wave variable function with its large harmonic components is replaced by a variable function which may have, relatively speaking, only small harmonic components but which none-the-less permits a high degree of accuracy. In other words, the present method decreases the need for violent and difficult discontinuities in the wave forms of the variable functions and thus makes it relatively easy to generate these variable functions. Briefly stated, this method includes the steps of generating a first variable which may be a voltage, a current, a mechanical movement, or the like, having straight-line wave-form segments, such as a triangular or a saw-tooth wave; shifting this first variable relatively to itself by an equal positive and a negative amount proportional to a first quantity to be multiplied to produce second and third variables whose instantaneous difference is proportional to the first quantity; providing fourth and fifth variables instantaneously differing from zero, or from the negative of the first variable, by a positive and a negative amount, respectively, proportional to a second quantity to be multiplied; and combining the second, third, fourth and fifth variables to obtain an output which is proportional to the product of the two quantities.

A simple and specific illustrative arrangement for carrying out the above outlined method includes a triangular wave voltage generator, means for biasing, i.e. shifting the position, of the triangular voltage relative to itself a positive and a like negative amount corresponding to a first input voltage proportional to a first quantity to be multiplied, a source of a positive and a negative input voltage equal to each other and proportional to a second quantity to be multiplied, four pairs of diodes, each pair arranged in a special circuit, which for convenience will hereinafter be called a "selector" circuit, for selecting the maximum (or minimum) instantaneous voltage of four of the six possible pairs of the four applied voltages; these voltages being (1) the positive shifted triangular wave, (2) the negative shifted triangular wave, (3) the positive input voltage and (4) the negative input voltage, and adding means for combining the four voltage outputs of these selectors to obtain a voltage which is proportional to the product of the two quantities to be multiplied. While this brief explanation of the method and apparatus of the present invention will help in understanding its general nature, a more complete understanding of the invention will best be gained from the following description given in connection with the accompanying drawings in which:

Figures 3, 4, 5 and 6 show waveforms appearing at intermediate points in the circuit of Figure 1 when it is supplied with voltages as shown in Figure 2; and Figure 7 shows a waveform of instantaneous output current for the circuit when so supplied.

Figure 1:
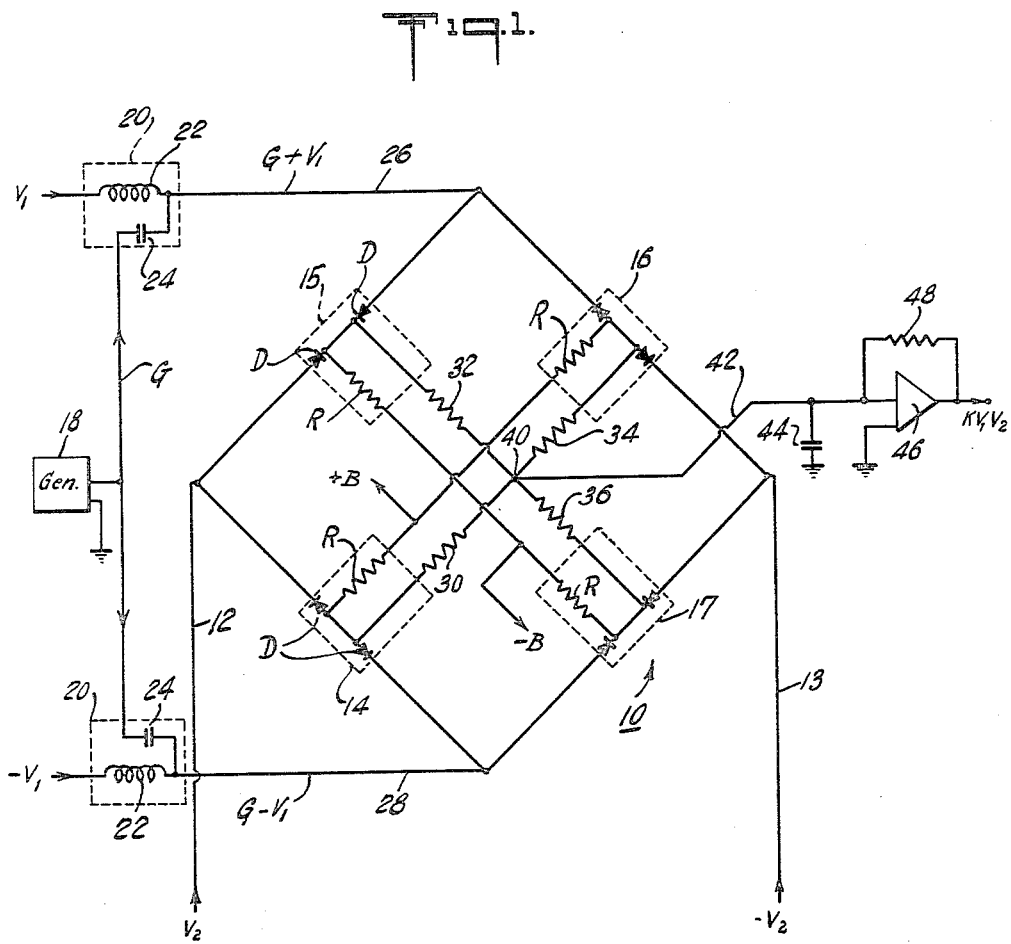
Figure 1 is a circuit diagram of one illustrative embodiment of the invention.

Referring to Figure 1, the circuit 10 illustrated is a multiplier adapted to give an output voltage $KV_1V_2$ proportional to the product of the input voltages $V_1$, $V_2$. Each of these input voltages is balanced with respect to ground and applied to the circuit in equal positive and negative parts as indicated. Voltages $V_2$ and $-V_2$ are applied directly via leads 12 and 13 to the selector matrix of the circuit, which matrix includes four of the selectors indicated by the dotted boxes 14, 15, 16, and 17. Voltage $V_1$ and $-V_1$, before being applied to this matrix, are first added to a high frequency triangular waveform voltage G supplied by the generator 18. It is assumed that the generator voltage has an appreciably higher frequency than voltage $V_1$ (and also $V_2$) and therefore G and $V_1$ are advantageously combined through the shifters indicated by the dotted boxes 20, each shifter containing a low resistance high frequency choke 22 and a small coupling capacitor 24. The sum of $V_1$ and G is applied to the selector matrix by lead 26 and the sum of $-V_1$ and G, by lead 28.

Figure 2:
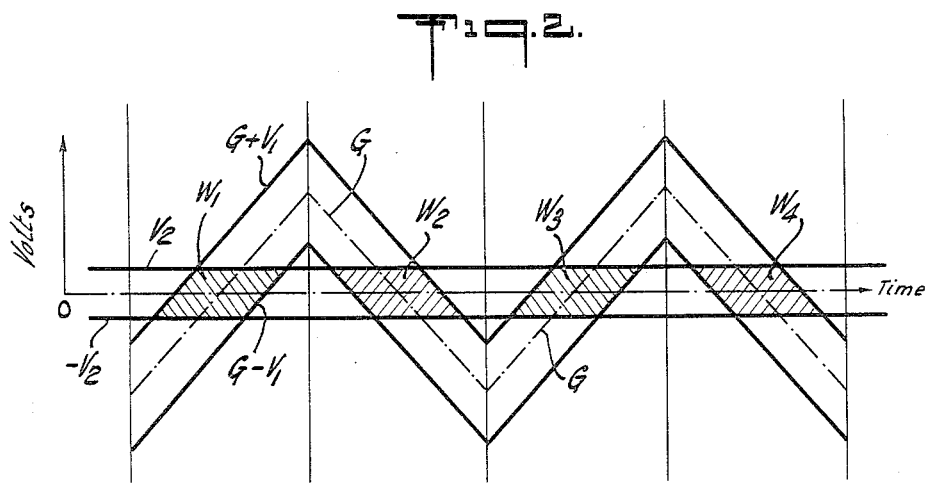
Figure 2 shows typical waveforms of input voltages which can be applied to the circuit of Figure 1.

Voltage G may have a waveform as illustrated in Figure 2 which waveform is a completely symmetrical triangular wave with sharp, un-rounded tops. Though this voltage need not be exactly as shown, for accuracy in circuit 10, it should have straight sides, sharp tops and equal positive and negative portions. Shown along with voltage G, are this voltage shifted positive by $V_1$, and shifted negative by $-V_1$, and voltages $V_2$, $-V_2$. The intersections of the pairs of $V_2$, $-V_2$ and $(G+V_1)$, $(G-V_1)$ define the cross-hatched areas $W_1$, $W_2$, $W_3$ etc. each of which, as shown in the above identified copending application, is proportional to the product $V_1V_2$.

Figure 3:
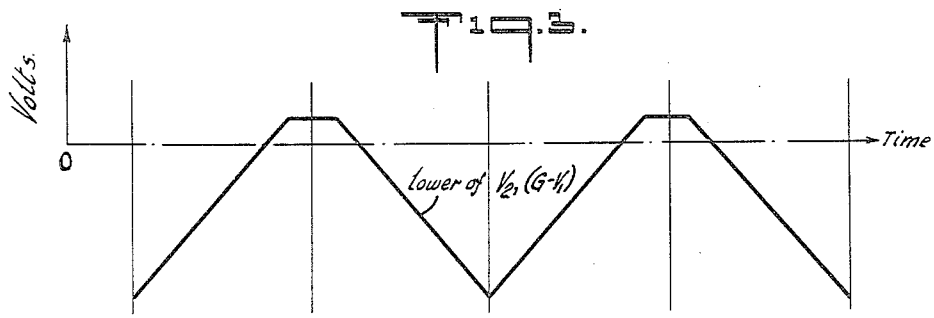
Figure 4:
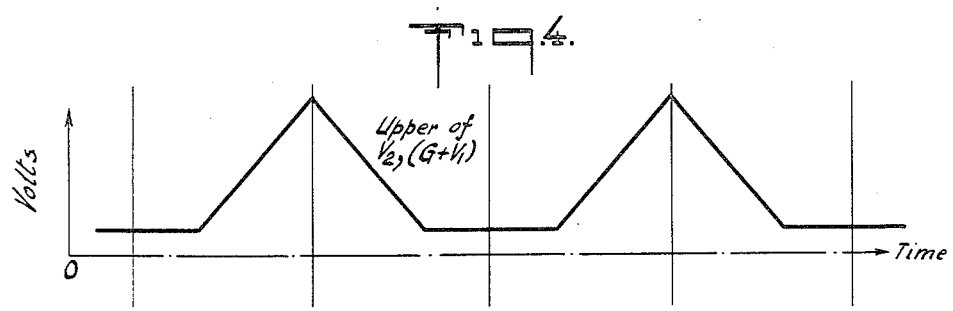

A signal proportional to this product is obtained from the waveforms of Figure 2 by the selector matrix of Figure 1. Each selector in the matrix is adapted to select a chosen one of the upper or lower value at any instant of time of the two voltages applied to it. Thus, selector 14, which is a lower selector, produces an output voltage across its resistor 30 which is shaped as shown in Figure 3, this voltage being the lower value at any instant of $V_2$ and $(G-V_1)$. The voltage across the output resistor 32 of upper selector 15 is shown in Figure 4, the voltage across the output resistor 34 of lower selector 16 is shown in Figure 5, and the voltage across the out resistor 36 of upper selector 17 is shown in Figure 6. A current produced by the instantaneous sum of these output voltages flows at the common junction 40 of resistors 30, 32, 34, 36 and is as shown in Figure 7. The time average of this current over a full cycle is proportional to the product of $V_1$, $V_2$.

To obtain this time average value, junction 40 is connected via the lead 42 to a filter capacitor 44 and to the output amplifier 46. The gain of this amplifier, and hence the proportionality factor K relating the output of circuit 10 to the actual product $V_1V_2$, can be adjusted by the feedback resistor 48.

Each selector in circuit 10 includes two diodes D having two of their like electrodes connected together to the respective output resistors 30, 32, 34, 36 and to the respective bias resistors R. The bias applied to the two diodes in a particular selector is such that at least one of the diodes is always able to conduct when the input voltages in Figure 2 have amplitudes within the ranges intended. For lower selector 14, diodes D have their plates connected together to a bias resistor R and to output resistor 30, their cathodes being connected to two respective corners of the matrix square. The other end of resistor R is connected to a source of direct positive voltage B+. In upper selector 15, the cathodes of diodes D are connected together to a bias resistor R which in turn is connected to a source of direct negative voltage B—, the plates of these diodes being connected to respective corners of the matrix square. The structure and operation of such selectors as will be appreciated, are essentially different from square law detectors, such as the rectifiers connected as shown in the Lakatos patent.

The selector matrix of circuit 10 herein differs from that shown in Figure 10 of the above-identified co-pending application in an important particular. Here, two upper and two lower selectors are connected on opposite sides of the matrix square whereas in Figure 10 of the said copending application, four upper (or four lower) selectors are used in the square. In that circuit the four outputs of the selectors are paired, added, and the two sums then subtracted to obtain a final output signal proportional to the product of two quantities being multiplied. Here, the four outputs of the selectors are simply added together and filtered to obtain an output signal.

The present circuit therefore is somewhat simpler than the previous ones though it has certain restrictions. Here, the inputs $V_1$, $V_2$ must be balanced with respect to ground and the voltage G must have, for the same degree of accuracy, a good degree of symmetry in waveform about its own average. In many applications these restrictions are not difficult to comply with and the simplicity of the circuit here, and its consequent lower cost, are very advantageous.

Though the present circuit is believed to be truly an area-type multiplier, as distinguished from a quarter-square one, as disclosed in the Lakatos patent, the areas $W_1$, $W_2$, etc. are not directly reproduced as discrete output pulses in the manner shown in the said co-pending application. Here, instead, the output must be averaged over at least a half-cycle (for a perfectly symmetrical voltage G) and in general over a full cycle. Comparable accuracy can be obtained, however, within the limits of the restrictions stated.

It is to be understood that in circuit 10 disclosed herein, input voltage $V_2$, balanced to ground, can be combined with the negative of voltage G in the same general way this is done in Figure 13 of the aforesaid co-pending application.

In an actual model, substantially identical to the embodiment of the invention illustrated, which has been built and satisfactorily tested, the following values and elements were used in the circuit: eight diodes D, type 1N55A; resistors 30, 32, 34, 36, each 250K ohms; B+, 300 volts; B—, 300 volts; voltage G, 150 volts peak to peak, at 1.5 megocycles frequency; each of voltages $V_1$, $V_2$, 50 volts peak to peak, at up to 15,000 cycles frequency; capacitors 24, 44, each .0001 microfarad; inductor 22, 2 millihenries; and resistors R, each 330K ohms.

The above description is intended in illustration and not in limitation of the invention. Various minor changes and modifications in the method and apparatus illustrated may occur to those skilled in the art and these may be made without departing from the spirit or scope of the invention as set forth.

We claim:

1. A simplified analog multiplier comprising: a selector matrix of four selectors connected as the sides of a square, each one of one pair of opposite selectors being adapted to select the upper value at any instant of two signals applied to it, each one of the other pair of opposite selectors being adapted to select the lower value at any instant of two signals applied to it, means for supplying a high frequency signal having a serrated or triangular waveform, means to shift said high frequency signal a positive and a like negative amount proportional to a first quantity to be multiplied to produce two intermediate signals, means to supply said intermediate signals to two opposite corners, respectively, of said matrix square, means to apply two other signals differing by an amount proportional to a second quantity to be multiplied to the other two corners of said square, respectively, and means to combine the outputs of said selectors to obtain a final signal proportional to the product of said first and second quantities.

2. The combination of elements as in claim 1 wherein each upper selector includes two diodes with their cathodes connected together to a bias resistor in turn connected to a negative bias source, the plates of said diodes being connected to two respective adjacent corners of said square, wherein each lower selector includes two diodes with their plates connected together to a bias resistor in turn connected to a positive bias source, their cathodes being connected to two respective adjacent corners of said square, and wherein said two intermediate signals and said two other signals are voltages.

3. The combination of elements as in claim 2 wherein said means to combine includes four output resistors each connected at one of its ends to a respective selector at the junction of its like diode-electrodes, the other ends of said output resistors being connected together.

4. In a simplified multiplier of the character described wherein two pairs of voltages are to be combined to obtain an output voltage proportional to the product of the difference between the two voltages in one pair and the difference between the two voltages in the other pair, a ring of eight diodes serially connected in a closed circuit, said diodes being grouped in pairs, a first pair having its cathodes connected together, the adjacent pair on each side of said first pair having their plates connected together and one cathode connected to a respective plate of said first pair, the remaining pair of diodes having their cathodes connected together and their plates connected to the remaining respective cathodes of said two adjacent pairs, and means to bias said pairs of diodes independently so that at least one or the other diode in each pair is able to conduct at all times during operation of said multiplier.

5. The combination of elements as in claim 4 wherein the two pairs of voltages are connected to the four junctions of diode plate to diode cathode, and in further combination with means connected to the four junctions of like diode electrodes to add the electric signals thereat and obtain an output electric signal proportional to said product.

6. A high speed, analog multiplier comprising a ring of eight diodes serially connected in a closed circuit, said diodes being grouped in pairs, a first pair having its cathodes connected together, the adjacent pair on each side of said first pair having their plates connected together and one cathode connected to a respective plate of said first pair, the remaining pair of diodes having their cathodes connected together and their plates connected to the remaining respective cathodes of said two adjacent pairs, means to bias said pairs of diodes independently so that at least one or the other diode in each pair is able to conduct at all times during operation of said mutiplier, a first high-pass low-pass filter and a second high-pass low-pass filter each of which has an output and a low frequency input and a high frequency input, means to generate a high frequency triangular or serrated voltage having a straight sided waveform, pointed tops and equal positive and negative portions, said triangular voltage being applied to each high frequency input of said filters, the outputs of said filters being connected respectively to a first pair of diagonally opposite unlike electrode junctions of said diodes, first means to apply equal positive and negative voltages corresponding to a relatively slowly varying first quantity to be multiplied to respective ones of said low frequency inputs, second means to apply equal positive and negative voltages corresponding to a relatively slowly varying second quantity to be multiplied to the remaining pair respectively of diagonally opposite unlike electrode junctions of said diodes, and adding means connected to the four like electrode junctions of said diodes to obtain an output signal proportional to the product of said first and second quantities.

7. The multiplier as in claim 6 wherein each of said filters comprises an inductor and a capacitor connected respectively between the filter inputs and output, and wherein said adding means includes four equal resistors having input and output ends, and an averaging capacitor, respective input ends of said resistors being connected to said four like junctions of said diodes, the output ends of said resistors being connected to said averaging capacitor.

No references cited.